US008688593B2

(12) United States Patent
Frank et al.

(10) Patent No.: US 8,688,593 B2
(45) Date of Patent: Apr. 1, 2014

(54) INFORMATION PROCESSING SYSTEM FOR PROCESSING PROSPECTIVE INDICATION INFORMATION

(75) Inventors: Scott M. Frank, Dunwoody, GA (US); Robert A. Koch, Norcross, GA (US); Jeffrey R. Kuester, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 121 days.

(21) Appl. No.: 11/538,697

(22) Filed: Oct. 4, 2006

(65) Prior Publication Data

US 2008/0086503 A1    Apr. 10, 2008

(51) Int. Cl.
*G06F 17/30* (2006.01)

(52) U.S. Cl.
USPC .......................................................... 705/310

(58) Field of Classification Search
USPC ................ 707/104.1, 791; 705/35, 36 R, 310
See application file for complete search history.

(56) References Cited

U.S. PATENT DOCUMENTS

| | | | |
|---|---|---|---|
| 5,875,431 A | 2/1999 | Heckman et al. | |
| 6,128,646 A * | 10/2000 | Miloslavsky | 709/206 |
| 6,556,992 B1 | 4/2003 | Barney et al. | |
| 2001/0011241 A1* | 8/2001 | Nemzow | 705/35 |
| 2001/0034695 A1* | 10/2001 | Wilkinson | 705/37 |
| 2001/0039526 A1* | 11/2001 | Pittenger | 705/36 |
| 2002/0007332 A1* | 1/2002 | Johnson et al. | 705/36 |
| 2002/0055858 A1* | 5/2002 | Jackson | 705/3 |
| 2002/0152147 A1 | 10/2002 | Shulman et al. | |
| 2002/0178029 A1* | 11/2002 | Nutter et al. | 705/1 |
| 2003/0028413 A1 | 2/2003 | White et al. | |
| 2003/0177083 A1 | 9/2003 | Mont et al. | |
| 2004/0060001 A1* | 3/2004 | Coffen et al. | 715/503 |
| 2004/0220842 A1* | 11/2004 | Barney | 705/7 |
| 2004/0230453 A1 | 11/2004 | Belmore | |
| 2005/0071174 A1* | 3/2005 | Leibowitz et al. | 705/1 |
| 2005/0261927 A1* | 11/2005 | Bilak et al. | 705/1 |
| 2005/0261933 A1 | 11/2005 | Magnuson | |
| 2006/0218066 A1* | 9/2006 | Block | 705/35 |
| 2006/0277053 A1* | 12/2006 | Lobb et al. | 705/1 |
| 2007/0073561 A1 | 3/2007 | Malackowski et al. | |
| 2007/0073625 A1 | 3/2007 | Shelton | |
| 2007/0073748 A1 | 3/2007 | Barney | |
| 2007/0226094 A1* | 9/2007 | Malackowski et al. | 705/35 |
| 2008/0086316 A1 | 4/2008 | Frank | |
| 2010/0332285 A1 | 12/2010 | Dunagan et al. | |

OTHER PUBLICATIONS

Kamiyama, Valuation and Exploitation of Intellectual Property, Jun. 2006, Organisation for Economic Co-operation and Development, DSTI/DOC(2006)5.*

(Continued)

*Primary Examiner* — Mahesh Dwivedi
(74) *Attorney, Agent, or Firm* — Hartman & Citrin LLC

(57) ABSTRACT

Selected embodiments of the present disclosure provide systems, methods and media for receiving prospective indication information and processing the received prospective indication information to generate result information. In certain embodiments, among others, a user is prompted to provide the prospective indication information, and at least a portion of the prospective indication information is converted into a common measurement system format and subsequently balanced in combination with other prospective indication information in the common measurement system format to generate balanced combination result information. In some embodiments, the processing further includes generating a result communication based at least in part upon the balanced combination result information, identifying a recipient for the result communication based at least in part upon the balanced combination result information, and transmitting the result communication to the recipient. Other systems, methods and media are also provided.

20 Claims, 8 Drawing Sheets

(56) References Cited

OTHER PUBLICATIONS

Article entitled "Run Differential", by DoubleX, published on Jul. 18, 2006.*
Frank; U.S. Appl. No. 11/538,690, filed Oct. 4, 2006.
U.S. Official Action dated Dec. 31, 2008 in U.S. Appl. No. 11/538,690.
U.S. Official Action dated Nov. 22, 1010 in U.S. Appl. No. 11/538,690.
U.S. Official Action dated Jun. 29, 2010 in U.S. Appl. No. 11/538,690.
U.S. Official Action dated Jan. 31, 2012 in U.S. Appl. No. 11/538,690.
U.S. Official Action dated Jul. 26, 2012 in U.S. Appl. No. 11/538,690.
U.S. Official Action dated Oct. 19, 2012 in U.S. Appl. No. 11/538,690.
U.S. Appl. No. 11/538,690 Office Action mailed Mar. 26, 2013.
Connect and Create Something . . . and Then These Guys Will Patent It, Mar. 25, 2002, WRALTechwire, retrieved from http://www.wraltechwire.com/business/tech_wire/biotech/story/1149247/ on Jan. 10, 2013.
"BellSouth Corporation: Strong Commitment to Licensing," May 5, 2002, WRALtechwire, retrieved from http://marketplace.yet2.com/app/insight/insight/20020505_bellsouth on Jan. 10, 2013.
U.S. Office Action dated Dec. 18, 2013 in U.S. Appl. No. 11/538,690.
"Office Action Correspondence Subsystem," OACS User's/Training Manual, Feb. 2003, OACS.

* cited by examiner

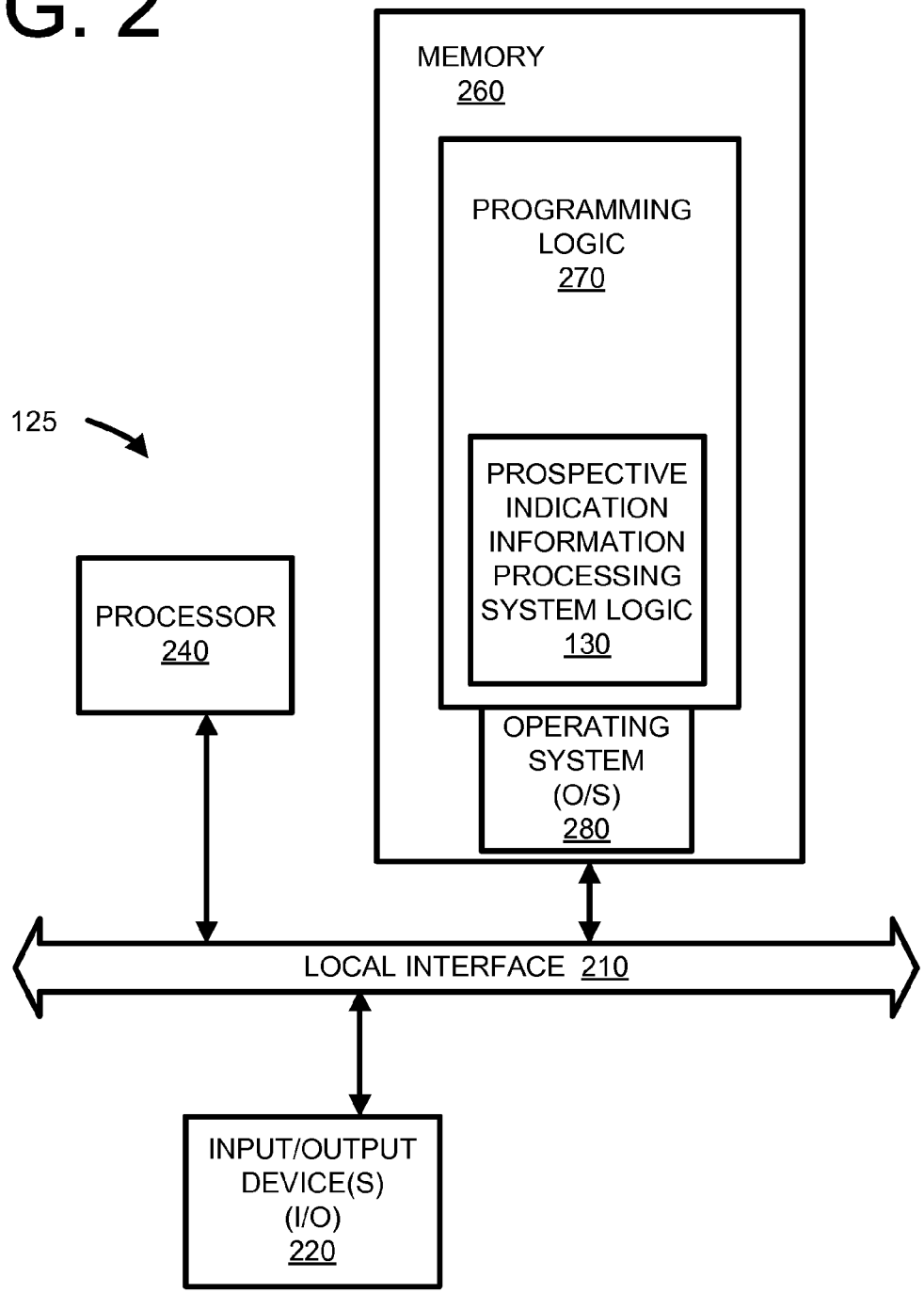

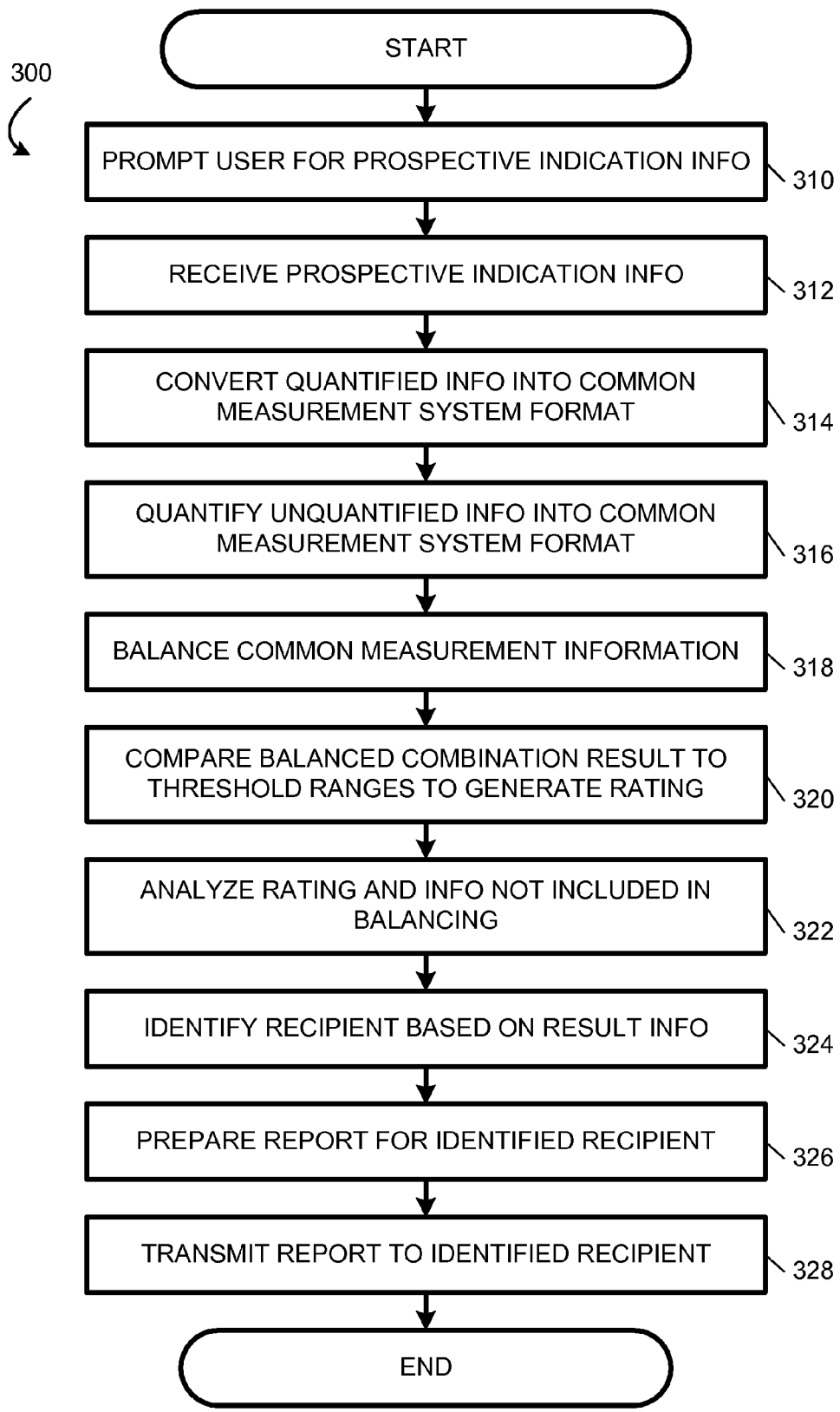

BROWSER

| BACK | FWD | STOP | HOME | REFRESH | OPTIONS | PRINT |

ADDRESS | HTTP://WWW.XYZCORPINTERNAL.COM/COMP.HTM

COMPETITIVE ADVANTAGE ASSESSOR — 420

PROSPECTIVE OPPORTUNITY ID: ▽ ? — 421
ASSET TO BE LICENSED: ▽ ? — 422
POTENTIAL LICENSEE: ▽ ?

POSITIVE VALUE ELEMENTS — 425

1. LICENSING ROYALTY: ▽ ? ✓ — 426
2. VALUE OF TECHNOLOGY OR
   IP TO BE RECEIVED IN TRADE: ▽ ? ✓
3. RELATIONSHIP GOODWILL: ▽ ? ✓
4. COMMUNITY SERVICE PUBLICITY: ▽ ? ✓
5. TECHNOLOGY LEADER PUBLICITY: ▽ ? ✓
6. ENCOURAGE INDUSTRY STANDARD: ▽ ? ✓
7. INCREASED BRAND RECOGNITION: ▽ ? ✓

*POSITIVE TOTAL:* — 428

NEGATIVE VALUE ELEMENTS — 430

1. LOST REVENUE FROM
   TRADITIONAL CUSTOMERS: ▽ ? ✓
2. DILUTION OF BRAND: ▽ ? ✓
3. RISK OF BAD QUALITY: ▽ ? ✓
4. IP INFRINGEMENT LIABILITY: ▽ ? ✓
5. OTHER POSSIBLE LIABILITY: ▽ ? ✓
6. DISTRACTION FROM CORE BUSINESS: ▽ ? ✓

*NEGATIVE TOTAL:* — 438

*BALANCED TOTAL:* — 440

*INPUT VALUE ELEMENTS WITH "$" FOR MONEY, SCALE OF 1 – 10, WITH "10" BEING MOST LIKELY/HIGHEST, OR DESCRIPTIVE TEXT, SUCH AS LIKELY, UNLIKELY, VERY UNLIKELY, HIGH, LOW, ETC.*

[ SAVE ] [ CANCEL ]

```
                                BROWSER
      ┌──────┬─────┬──────┬──────┬─────────┬─────────┬───────┐
      │ BACK │ FWD │ STOP │ HOME │ REFRESH │ OPTIONS │ PRINT │
      ├──────┴─────┴──────┴──────┴─────────┴─────────┴───────┤
      │ ADDRESS │ HTTP://WWW. XYZCORPINTERNAL.COM/COMP.HTM   │
      └─────────┴─────────────────────────────────────────────┘
```

COMPETITIVE ADVANTAGE ASSESSOR — 420

PROSPECTIVE OPPORTUNITY ID: [ ] — 421
ASSET TO BE LICENSED: [ ] — 422
POTENTIAL LICENSEE: [ ]

POSITIVE VALUE ELEMENTS — 425

1. LICENSI...
2. VALUE O... IP TO BE...
3. RELATIO...
4. COMMUN...
5. TECHNO...
6. ENCOUR...
7. INCREAS...

DEFINITIONAL SETUP SCREEN   X

RELATIONSHIP GOODWILL
USE RANGE OF 1-10, TEXT, OR $
TO INDICATE VALUE OF ANY
RELATIONSHIP GOODWILL LIKELY
RESULTING FROM OPPORTUNITY

CONVERSION FROM:   CONVERSION TO:
[ 5 ]▼              [ "P3xP1" ]▼

— 426
— 500
— 505
— 510
— 512
— 516
— 514

QUANTIFICATION FROM:   QUANTIFICATION TO:
[ HIGH ]▼              [ $1,000,000 ]▼

— 526
— 528
— 522
— 520

1. LOST RE... TRADITI...
2. DILUTIO...
3. RISK OF...
4. IP INFRI...

[ SAVE ]   [ CANCEL ]

5. OTHER POSSIBLE LIABILITY: [ ]
6. DISTRACTION FROM CORE BUSINESS: [ ]

NEGATIVE TOTAL: [ ] — 438

_BALANCED TOTAL:_ [ ] — 440

*INPUT VALUE ELEMENTS WITH "$" FOR MONEY, SCALE OF 1 – 10, WITH "10" BEING MOST LIKELY/HIGHEST, OR DESCRIPTIVE TEXT, SUCH AS LIKELY, UNLIKELY, VERY UNLIKELY, HIGH, LOW, ETC.*

[ SAVE ]   [ CANCEL ]

BROWSER

| BACK | FWD | STOP | HOME | REFRESH | OPTIONS | PRINT |

ADDRESS: HTTP://WWW.XYZCORPINTERNAL.COM/COMP.HTM

COMPETITIVE ADVANTAGE ASSESSOR — 420

- PROSPECTIVE OPPORTUNITY ID: 32872 — 421, 422
- ASSET TO BE LICENSED: U.S. Pat. No. 8,235,678
- POTENTIAL LICENSEE: ABC Corporation

POSITIVE VALUE ELEMENTS — 425

1. LICENSING ROYALTY: $10,000,000 — 426
2. VALUE OF TECHNOLOGY OR IP TO BE RECEIVED IN TRADE: None
3. RELATIONSHIP GOODWILL: 8
4. COMMUNITY SERVICE PUBLICITY: 5
5. TECHNOLOGY LEADER PUBLICITY: Good
6. ENCOURAGE INDUSTRY STANDARD: 7
7. INCREASED BRAND RECOGNITION: 0

POSITIVE TOTAL: $15,000,000 — 428

NEGATIVE VALUE ELEMENTS — 430

1. LOST REVENUE FROM TRADITIONAL CUSTOMERS: $5,000,000
2. DILUTION OF BRAND: 5
3. RISK OF BAD QUALITY: 5
4. IP INFRINGEMENT LIABILITY: Very low
5. OTHER POSSIBLE LIABILITY: $500,000
6. DISTRACTION FROM CORE BUSINESS: 1

NEGATIVE TOTAL: $12,000,000 — 438

BALANCED TOTAL: $3,000,000 — 440

*INPUT VALUE ELEMENTS WITH "$" FOR MONEY, SCALE OF 1 – 10, WITH "10" BEING MOST LIKELY/HIGHEST, OR DESCRIPTIVE TEXT, SUCH AS LIKELY, UNLIKELY, VERY UNLIKELY, HIGH, LOW, ETC.*

[ SAVE ] [ CANCEL ]

710 — From: Competitive Advantage Assessment System
To: Mr. John Smith ("j.smith@ company.com")
Subject: Prospective Opportunity ID: 32872

Competitive Value Assessment Report

720 — Prospective Opportunity ID: 32872 corresponds to an opportunity for U.S. Pat. No. 8,235,678 with ABC Corporation, which is headquartered in Nashville, TN, has approximately 1,000 employees, and annual gross revenue of approximately $5,000,000,000.

730 — A prospective license would generate approximately $10,000,000 in royalty revenue, generate a high level of relationship goodwill and standard setting opportunity, with only moderate community service and technology leader publicity opportunity, and no use of IP or technology in trade or increased brand awareness.

740 — However, the risk of lost revenue from traditional customers due to increase competition would be approximately $5,000,000, with moderate risks of brand dilution and bad quality, but very little risk of additional IP or other liability or distraction from our core business.

750 — Consequently, after balancing the various inputs, the Rating for this opportunity is "FURTHER ANALYSIS NEEDED," so please investigate further to make a final decision regarding this opportunity.

760 — In addition to the rating, and as a result of additional analysis independent of that conclusion, this opportunity should be carefully considered because of the size of the potential licensee and the close proximity to our location.

FIG. 7

BROWSER

| BACK | FWD | STOP | HOME | REFRESH | OPTIONS | PRINT |

ADDRESS: HTTP://WWW.XYZCORPINTERNAL.COM/MNG.HTM

PORTFOLIO MANAGER

PORTFOLIO SEGMENT SCENARIO ID: 2853

| PROSPECTIVE OPPORTUNITY IDs | POSITIVE TOTALS | NEGATIVE TOTALS | BALANCED TOTALS | LIKELI-HOODS |
|---|---|---|---|---|
| 32872 | $15M | $12M | $3M | .55 |
| 33899 | $100M | $8M | $92M | .25 |
| 35905 | $35M | $30M | $5M | .80 |

LIKELIHOOD DEFINITION X

| .30 | STRENGTH OF ASSET |
| .10 | LICENSEE COMPLIANCE |
| .15 | TIMING HORIZON |
| .55 | TOTAL LIKELIHOOD |

SAVE   CANCEL

LIKELIHOOD-WEIGHTED TOTALS

| POSITIVE | NEGATIVE | BALANCED | AVG LIKELI-HOOD |
|---|---|---|---|
| $61.25M | $32.6M | $28.65M | .53 |

LIKELIHOOD-WEIGHTED BALANCED TARGET: $25M

LIKELIHOOD-WEIGHTED TARGET COMPARISON: $3.65M

SAVE   CANCEL

FIG. 8

INFORMATION PROCESSING SYSTEM FOR PROCESSING PROSPECTIVE INDICATION INFORMATION

TECHNICAL FIELD

The present disclosure is generally related to information processing and is more particularly related to processing indication information.

BACKGROUND

Systems including logic for processing information are widespread and often include logic embodied in one or more software programs stored in memory or other recordable media for execution or interpretation by a processor. Furthermore, many such systems for processing information include software-based user interfaces for prompting users to provide information to be processed by the system. While there are often needs for large volumes of information processing, there are often limits on the types and amounts of information that can be intelligently processed by such systems. In addition, outputs generated by such systems often provide little actual value to users who might otherwise benefit from such processing.

Thus, heretofore unaddressed needs exist in the industry to address the aforementioned deficiencies and inadequacies, as well as address other issues not mentioned above.

SUMMARY

Selected embodiments of the present disclosure provide systems, methods and media for receiving prospective indication information and processing the received prospective indication information to generate result information. In certain embodiments, among others, a user is prompted to provide the prospective indication information, and at least a portion of the prospective indication information is converted into a common measurement system format and subsequently balanced in combination with other prospective indication information in the common measurement system format to generate balanced combination result information. In some embodiments, the processing further includes generating a result communication based at least in part upon the balanced combination result information, identifying a recipient for the result communication based at least in part upon the balanced combination result information, and transmitting the result communication to the recipient. In certain embodiments, large amounts of prospective indication information are processed to generate numerous balanced combination results that are further processed.

Other methods, features, devices, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a block diagram representation of the prospective indication information processing system implemented in a general purpose computer system with implementation specific program logic, in accordance with one embodiment of the present disclosure.

FIG. 3 is a flow chart representation of one example process of the example implementation shown in FIG. 1.

FIG. 4 is a screen shot view of one example of a user input screen, in accordance with one embodiment of the present disclosure.

FIG. 5 is a screen shot view of one example of a user input screen, showing a setup screen for a prompt, in accordance with one embodiment of the present disclosure.

FIG. 6 is a screen shot view of one example of a user input screen showing sample inputs, in accordance with one embodiment of the present disclosure.

FIG. 7 is a screen shot view of one example of a result communication, in accordance with one embodiment of the present disclosure.

FIG. 8 is a screen shot view of one example of a screen for managing multiple prospective opportunity scenarios, in accordance with one embodiment of the present disclosure.

DETAILED DESCRIPTION

Figure 1:
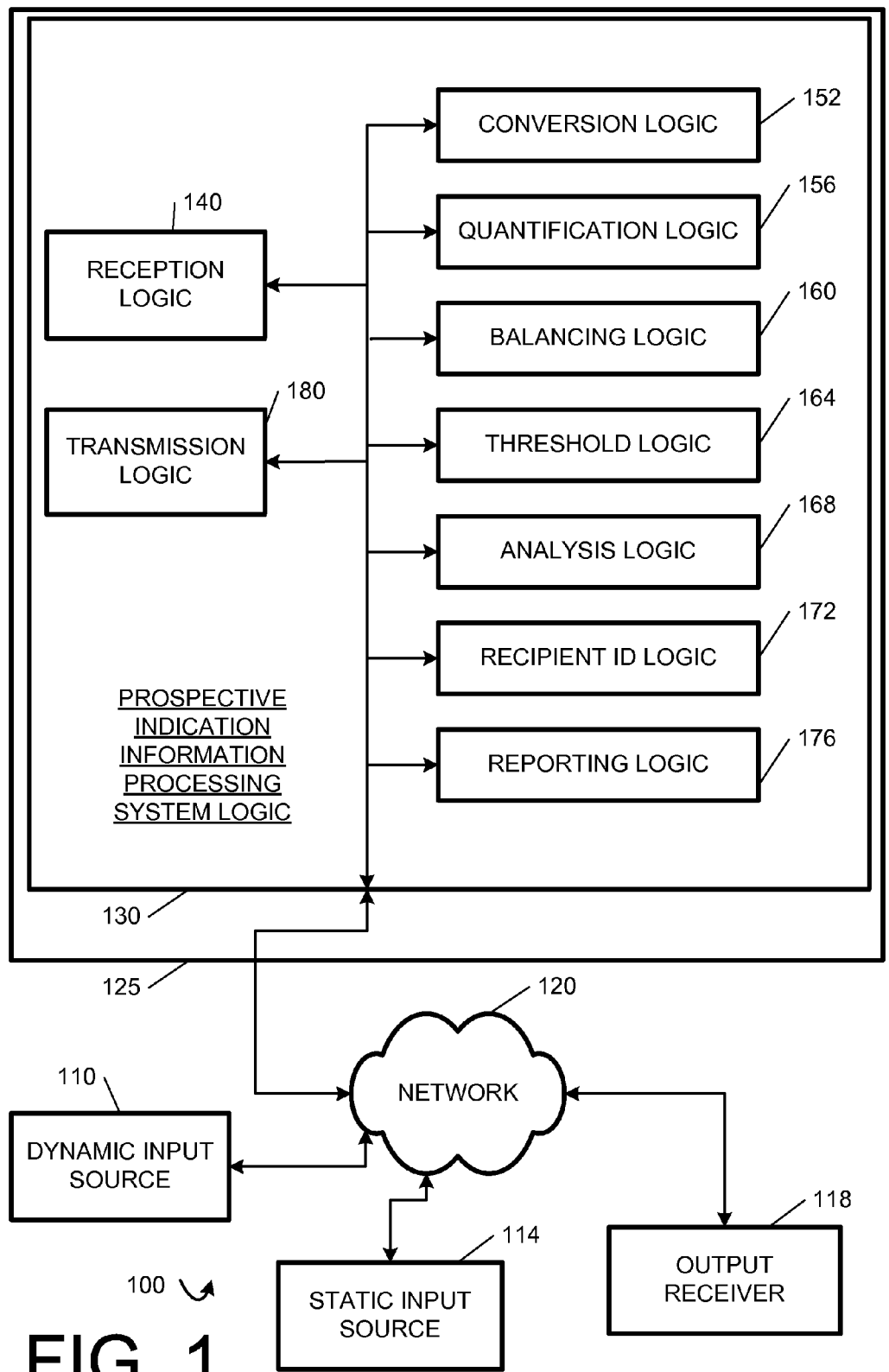
FIG. 1 is a high level block diagram representation of one embodiment of a prospective indication information processing system in a representative environment.

Many aspects of the present disclosure can be better understood with reference to the following drawings. The components in the drawings are not to scale, emphasis instead being placed upon clearly illustrating the principles of the present disclosure. Moreover, in the drawings, like reference numerals designate corresponding parts throughout the several views. While several embodiments are described in general and in connection with these drawings, there is no intent to limit the disclosure to the example embodiments and implementations disclosed herein since the examples are intended to be considered among other examples that will be understood. On the contrary, the intent is to also cover alternatives, modifications, and equivalents.

Selected embodiments of the present disclosure provide systems, methods and media for receiving prospective indication information and processing the received prospective indication information to generate result information. In some examples, a user is prompted for prospective indication information, and at least a portion of the prospective indication information is converted into a common measurement system format, including quantification in some examples, and subsequently balanced in combination with other prospective indication information in the common measurement system format to generate balanced combination result information, which is then compared to a plurality of threshold ranges for rating purposes. In some embodiments, processing further includes an analysis in addition to the balancing process, and in some examples, such analysis is further based upon information not considered as part of the balancing process. In some implementations, based upon the balanced combination result information and the analysis, a result communication is generated and transmitted, and the recipient for the result communication is determined at least in part based upon the balanced combination result information and the analysis. Still other embodiments include further processing of information from multiple prospective opportunities.

There are many types of prospective indication information, all of which are intended to be within the scope of the present disclosure. Broadly speaking, principles and teachings of the present disclosure can be applied to a variety of potentials in a variety of environments. One type of prospective indication information includes prospective indication information related to a possible licensing arrangement (or other transfer arrangement or agreement). Transfer arrangements include, among others, permitting utilization of, and/or disclosing information regarding, technology, know how, and/or intellectual property, including trade secrets, trademarks, copyrights, patents, etc. Though some implementations do not include frameworks for such transfer arrangements, examples of frameworks for implementations that include such frameworks include, among others, licenses, assignments, other types of agreements, etc. In accordance with one specific example, among others, prospective indication information processing for a potential licensing arrangement includes generating a competitive advantage assessment (result information) that includes balanced combination result information that is compared to a plurality of threshold ranges for rating the possible licensing arrangement. Possible ratings include, among others, recommendations for or against proceeding with a particular licensing effort, including discrete numeric levels for the recommendations, as well as additional ratings, such as a rating that additional information is needed, among others. A common measurement system can include a monetary format, e.g., U.S. dollars; thus, conversion and quantification can include translation processes that convert and quantify prospective indication information into dollars for balancing with other input provided in that monetary format.

In one particular implementation, a problem encountered by many companies, as well as other types of entities, organizations and individuals, is addressed. For example, it is common for companies to develop technologies, processes and other innovations that are primarily directed or developed in response to internal needs of the companies, such as improving billing systems, running internal networks, or other internal processes, among many other examples. While many of those examples are developed without any (or any significant) consideration of potential use by external entities, those examples are nonetheless valuable investments. In an effort to maximize returns on such investments, and/or satisfy other objectives, the possibility often exists for disclosing and/or licensing such innovations, etc., to other companies, some of which may be in competition with the company (potential licensor) considering whether to license the use of its innovations. As a result of that competitive relationship, there are potential costs associated with the licensing opportunity that are often overlooked or not appropriately considered, resulting in difficult or incorrect decision making. Previously, the risks associated with licensing, or selling, or otherwise transferring to those other companies or organizations, which are in essence non-traditional customers being sold a non-traditional product or service, even if no money is exchanging hands, were also often difficult to quantify or to realistically compare with potential revenue that may be received from a license, or other transfer transaction. Furthermore, there are also other benefits, in addition to the potential licensing revenue, that should be considered in this process, but there was previously no systematic way to effectively consider such factors in this prospective process. Accordingly, some embodiments of the present disclosure provide systems, methods and media for receiving input information regarding a prospective transfer arrangement, converting and quantifying the information, balancing the information, comparing balancing results to ranges of thresholds for establishing a rating, and providing additional analysis that is reported to a user based at least in part upon the outcome of the balancing. Other embodiments include additional collecting and further processing of information regarding multiple prospective opportunities to provide additional portfolio management functionality, such as licensing program management functions encompassing a multitude of prospective opportunities. For example, in some embodiments, likelihood factoring and timing horizon considerations are included as part of target revenue planning and risk assessment management for a group of assets, e.g., a portfolio segment, as discussed in further detail below.

Refer now to FIG. 1, which shows a high level block diagram representation of one embodiment of a prospective indication information processing system 125 in a representative environment 100. A dynamic input source 110 is shown connected along with a static input source 114 and an output receiver 118 through a network 120 to the information processing system 125. Among other elements discussed below, information processing system 125 includes prospective indication information processing system logic 130, which includes at least, in accordance with one implementation, among others, reception logic 140, conversion logic 152, quantification logic 156, balancing logic 160, threshold logic 164, analysis logic 168, recipient identification (ID) logic 172, reporting logic 176, and transmission logic 180. Some embodiments are completely automated, while others include varying levels of human involvement. For example, in one embodiment, the dynamic input source 110 includes a conventional user workstation operated by a human user interfacing through a conventional browser program to input data, such as prospective indication information, through one or more web page interfaces generated by reception logic 140, which includes web server functionality (e.g., generation of dynamic or static HTML (Hypertext Markup Language) data) to prompt the user for input as discussed below in accordance with that embodiment. Other embodiments include automated sources for dynamically generated input that provide automated responses to queries from the reception logic 140, including intelligent processes and other sources of changing information. By contrast, static input source 114 includes, in one embodiment, database functionality for storing and providing, in response to queries or other communications with reception logic 140, information regarding assets, companies, organizations, people, etc. (including regarding the potential licensor and licensee, for example) that remains fairly constant, e.g., locations, gross revenues, gross profits, and numbers of employees for companies, areas of market participation, areas of competition, details about any existing relationships with the licensor, market shares, histories of certain types of activities, etc. Other embodiments do not include a static input source and instead receive the previous types of information "on the fly", i.e., as part of the dynamic input source, such as through user input through dynamic input source 110.

After reception logic 140 receives prospective indication information, as discussed in more detail below, further processing by the prospective indication information processing system logic 130 includes, in one embodiment, among others, any necessary data conversion into a common measurement format by conversion logic 152, quantification of information by quantification logic 156, balancing of common measurement formatted information by balancing logic 160, comparison of balancing results to ranges of thresholds for rating by threshold logic 164, analysis by analysis logic 168, identification of an appropriate recipient for (and based at least in part on) balancing result information and analysis information by recipient identification (ID) logic 172, and preparation of a communication to the identified recipient by reporting logic 176. Subsequently, transmission logic 180 transmits the prepared communication through network 120 for delivery to the identified recipient, which is represented by output receiver 118. In one embodiment, output receiver 118 includes a human user operating a conventional workstation receiving a communication, such as an e-mail message, while other embodiments include more automation, such as automated functionality for receiving and further processing the communication. In addition, while the processing by logic elements 152, 156, 160, 164, 168, 172 and 176 does not include user input during operation in one embodiment, other embodiments include varying levels of user input during that processing, e.g., to gain additional information, resolve conflicting information, present options, confirm defaults, etc. For example, in some embodiments, the conversion logic prompts a user to choose a common measure system format among various options, quantification logic 156 prompts a system operator user or the user providing initial input to rank or manually quantify information that was not properly ranked initially or that falls outside acceptable ranges, etc.

Refer now to FIG. 2 for a block diagram representation of the prospective indication information processing system 125 implemented in a general purpose computer system with implementation specific program logic, in accordance with one embodiment of the present disclosure. FIG. 2 represents one embodiment of a computing device, though there is no intention to limit the present disclosure to any particular type of computing device. As shown, the prospective indication information processing system 125 includes a processor 240, memory 260, and one or more input and/or output (I/O) devices 220 (or peripherals) that are all communicatively coupled via a local interface 210. The local interface 210 includes, for example but not limited to, one or more buses or other wired or wireless connections, as is known in the art. The processor 240 includes, in one embodiment, a hardware device for executing (or interpreting) software, particularly that stored in memory 260. The memory 260 includes any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 260 may incorporate electronic, magnetic, optical, and/or other types of storage media. Note that the memory 260 can also have a distributed architecture, where various components are situated remote from one another, but can be accessed by the processor 240.

In one embodiment, the software in memory 260 includes multiple separate programs, represented collectively as prospective indication information processing system logic 130, each of which comprises an ordered listing of executable instructions for implementing logical functions, for example, to provide the various functions discussed herein. As shown, the software in the memory 260 includes at least prospective indication information processing system logic 130 and operating system (O/S) 280. In one embodiment, the operating system 280 controls the execution of other computer programs, such as the prospective indication information processing system logic 130, and provides scheduling, input-output control, file and data management, memory management, and communication control and related services. The I/O devices 220 may include input devices, for example but not limited to, a keyboard, mouse, scanner, microphone, etc. Furthermore, the I/O devices 220 may also include output devices, for example but not limited to, a printer, display, etc. Finally, the I/O devices 220 may further include devices that communicate both inputs and outputs, for instance but not limited to, a modulator/demodulator (modem; for accessing another device, system, or network), a network access device, a radio frequency (RF) or other transceiver, a telephonic interface, a bridge, a router, etc. If the prospective indication information processing system 125 is implemented as a personal computer (PC), workstation, server, or the like, the software in the memory 260 may further include a basic input output system (BIOS). The BIOS is a set of software routines that initializes and tests hardware at startup, starts the O/S 280, and supports the transfer of data among the hardware devices. The BIOS is preferably stored in ROM so that the BIOS can be executed when the prospective indication information processing system 125 is activated. When the prospective indication information processing system 125 is in operation, the processor 240 is configured to execute software stored within the memory 260, to communicate data to and from the memory 260, and to generally control operations of the prospective indication information processing system 125 pursuant to the software. The prospective indication information processing system logic 130 and the O/S 280, in whole or in part, are read by the processor 240, and perhaps buffered within the processor 240, and then executed. Since the prospective indication information processing system logic 130 is also implemented in other embodiments in multiple computing devices or in other processed environments, it should be clear that the "system" in such embodiments can be multiple computers or other processing arrangements and constructs.

With continuing references to FIG. 1, refer also to FIG. 3, which shows a flow chart representation of one example process 300 of the example implementation shown in FIG. 1. The process 300 includes, as indicated by step 310, prompting a user (e.g., dynamic input source 110) for prospective indication information, which is indicated as being received in step 312, all of which is handled in one example embodiment by reception logic 140 shown in FIG. 1, as discussed above. Refer also to FIG. 4, which is a screen shot view of one example input screen 400 that may be presented to a user as part of step 312 for an example licensing implementation. Of course, preceding and subsequent screens are also presented in some embodiments in order to initiate process 300, including options to identify a previously created prospective indication information processing project for modification or to create a new project. Thus, additional logic is included in such embodiments as part of reception logic 140 for storing inputs, results, analyses, and records of communications for subsequent retrieval and management. In various embodiments, reception logic 140 (as well as each of the other logic elements of FIG. 1) includes storage logic (such as for interfacing with driver elements of O/S 280 in FIG. 2) for storing data into, and retrieving data from, volatile and non-volatile storage, which may be located locally or remotely, including through a network. In some embodiments, such data includes the program code executed or otherwise interpreted to perform the described functions, including processing code and web page or other interface information, as well as data regarding the input, results, analyses, records of communications, etc., all of which may be located locally or remotely from prospective indication information processing system 125.

Input screen 400 is shown in the form of a web page. Consequently, in one embodiment, as discussed above, a web server component of the reception logic 140 formats data into (and interprets data received in) HTML (Hypertext Markup Language), or any other format that can be interpreted by users, for transmission through the network 120 to users. As would be understood by one reasonably skilled in the art of the present disclosure, such a web server component utilizes HTTP (HyperText Transfer Protocol), as well as other protocols, to communicate HTML data (or data in other formats) to and from user devices. In one embodiment, the web server component also executes scripts and other programs to serve (transmit to users) static and dynamically generated web pages based upon statically stored and dynamically generated data, including data dynamically received from various systems. User computing devices also include web browsing programming, such as browser software, one example of which is Microsoft® Internet Explorer, among others. In other embodiments, other methods of communication are utilized, including electronic mail (e-mail), instant messaging, etc. Of course, in such embodiments, user computers also include any additional client software for accomplishing such communications. In addition, application servers and additional software and components (not shown) are also included within the prospective indication information processing system 125 in other embodiments in order to accomplish the various functions referenced herein. Embodiments are also included wherein multiple servers are performing similar functions, such as web serving, among others, and additional load balancing servers are used to spread the load across the multiple servers.

As mentioned above, FIG. 4 is related to a licensing implementation of the present disclosure, and more specifically, in one example among others, is related to a competitive advantage assessor for intellectual property assets. Input screen 400 is shown including a header entitled, "Competitive Advantage Assessor," prospective opportunity descriptive information section 420, a positive value elements section 425, and a negative value elements section 430. Each of the sections 420, 425, and 430 includes a variety of prospective information prompts for users to input or select information. Prospective opportunity descriptive information section 420 first includes a prompt for a prospective opportunity identification (ID). In one embodiment, the prospective opportunity ID prompt will default to a new number (or other alphanumeric designation) that is automatically generated by the reception logic 140, while in other embodiments, a user is required to keep track and assign each prospective opportunity ID manually, or this prompt is omitted. Of course, other embodiments exist where one or more of any of the prompts do not exist, while other embodiments include additional prompts.

An existing prospective opportunity ID can preferably be selected from a dropdown list resulting in a typical manner through user activation of a dropdown arrow 421, or other user interface mechanism in other embodiments. As with activation of other dropdown arrows 421 shown on input screen 400, logic accesses data storage (resident or remotely located) to display the dropdown list and to record and store the user selection. Furthermore, selection of an existing prospective opportunity ID will preferably result in logic accessing data storage to populate remaining prompts with previously stored information. Thus, in some embodiments, the prospective opportunity ID serves as a record identifier in a storage database that stores at least one record for each prospective opportunity. In addition, other embodiments include additional management logic for querying, displaying, reporting, sorting, comparing and analyzing multiple records of such stored information, both individually and in combination with other records. Such management includes, for example, sorting and comparing based on any of the stored fields, which correspond to prompts on input screen 400, as well as other information that is retrieved from other sources and information resulting from processing and communicating discussed herein. Help icons 422 are also shown associated with each of the prompts in FIG. 4. Preferably, user activation of a help icon 422 will result in the display of instructional information regarding the associated prospective information prompt. In addition, user activation of the help icons 422 associated with at least some of the prospective information prompts shown in FIG. 4 will also result in the additional display of user definitional prompts, such as on a setup screen, for receiving definitional information from users regarding methods to be used for quantifying and converting associated prospective information inputs, as discussed below.

Prospective opportunity descriptive information section 420 also includes a prompt for receiving information regarding the "asset to be licensed." In one embodiment, this input can simply be descriptive text that is provided by the user, while other embodiments include links (such as through a dropdown arrow 421) into an intellectual property asset management system that includes records corresponding to previously identified assets. Accordingly, such a static input source 114 could also provide additional information about assets, including type, status and history of particular intellectual property assets, etc. Still other embodiments include intellectual property asset management systems that include the prospective indication information processing system 125 as one or more components within those systems, including embodiments in which prospective indication information processing system logic 130 is integrated with other asset management functionality. At least one example, among others, of an intellectual property asset management system is included in U.S. patent application Ser. No. 09/750,130, which is hereby incorporated herein by reference in its entirety. Some embodiments include other input mechanisms for identifying the asset to be licensed, and in some embodiments, multiple assets may also be identified or otherwise input simultaneously.

Prospective opportunity descriptive information section 420 also includes a prompt for identification of a potential licensee. Similarly, such information may be input as text or other identifying method, or through a mechanism linked to another database (such as through the associated dropdown arrow 421) enabling selection of known and previously defined potential licensees. Based upon identification of the prospective licensee, additional information regarding the potential licensee can be retrieved from information sources, including static input source 114. On the other hand, if no specific potential licensee is identified, processing continues in a manner that assumes a generic potential licensee, e.g., stored characteristics of a generic potential licensee are used. In some embodiments, the associated dropdown arrow 421 instead provides a "Generic" potential licensee option for a user to select. In some embodiments, one level of analysis of the prospective licensing arrangement is based simply on the identification of the asset to be licensed and of the potential licensee since additional static information regarding the licensee is retrieved and analyzed with regard to information known about the asset. In other words, in such an embodiment, a user would not need to provide any additional input in sections 425 and 430.

A positive value elements section 425 is shown including a variety of prompts, including prompts for licensing royalty, value of technology or intellectual property (IP) to be received in trade, relationship goodwill, community service publicity, technology leader publicity, encourage industry standard, and increased brand recognition. Negative value elements section 430 is also shown including prompts for lost revenue from traditional customers, dilution of brand, risk of bad quality, IP infringement liability, other possible liability, and distraction from core business. A note at the bottom of input screen 400 instructs a user to, "Input value elements with "$" for money, scale of 1-10, with "10" being most likely/highest, or words, such as likely, unlikely, very unlikely, high, low, etc." Similar instructions, modified for each prompt and in addition to other instructions and definitional setup options, are also preferably provided upon user activation of each of the associated help icons 422. Consequently, for the example input screen 400 shown in FIG. 4, each of the prompt boxes in sections 425 and 430 are understood to be universal input areas in which universal logic will interpret multiple types of input schemes from a user, including monetary entries delineated with a preceding "$" indication, numbers on a scale of 1-10, with 10 representing the most likely or highest (magnitude, etc.), or regular text that can be interpreted as indicative of a level. It should be noted that numerous other examples of input mechanisms are also included within the scope of the present disclosure. For example, among others, drop-down boxes, radio buttons, check boxes, sliding scales, etc., are alternatively provided in other examples for a user to select exact, or ranges of, values of money, numbers on a relative scale, predefined text, or other input formats.

A checkbox 426 is also shown associated with each of the prompts in the positive value elements section 425 and negative value elements section 430. Each checkbox 426 is shown checked, or selected, in FIG. 4, which is preferably a default condition. If a checkbox 426 associated with (i.e., located adjacent to) a particular prompt is checked, information provided through that particular prompt (i.e., received from a user) is included in subsequent processing, i.e., quantification, conversion, summing, balancing, etc., as discussed below. Conversely, if a checkbox 426 for a particular prompt is not selected, user input for that particular prompt is ignored for such subsequent processing. A positive total display area 428 and a negative total display area 438 are shown at the bottom of the positive value elements section 425 and negative value elements section 430, respectively. The positive total display area 428 will show a positive value elements total, i.e., preferably the result of summing logic that sums information resulting from the prompts in the positive value elements section 425, which can include quantification and conversion, as discussed in more detail below. Likewise, the negative total display area 438 will show a negative value elements total, i.e., preferably the result of summing logic that sums information resulting from the prompts in the negative value elements section 430, which also can include quantification and conversion, as discussed in more detail below. The summing logic for the positive total display area 428 and the summing logic for the negative total display area 438 preferably ignore, or otherwise give no effect to, prompts that are not selected through an associated checkbox 426, as well as those for which no input is provided from a user. A balanced total area 440 will show a combined total (difference) of the positive value elements total shown in positive total display area 428 and the negative value elements total shown in negative total display area 438, preferably resulting from logic associated with the balanced total area 440. Of course, the logic elements associated with example input screen 400 are preferably automatic, and in one implementation, the automation provides for continual updating of the total areas 428, 438, and 440 as user inputs are received through the various prompts, dropdown arrows, checkboxes, and definitional settings. Other implementations include an additional "submit" or "calculate" button (not shown) that will initiate automated logic upon user activation of such a button.

In one embodiment, the prompt for licensing royalty in the positive value elements section 425 is provided to receive from a user an estimate of the total amount of money that may be received from a licensee as a licensing royalty. Other embodiments include estimated annual amounts, and still others provide input options for selecting among different types of royalty payment plans, including lump sum, running royalty, etc., the various types of which would be understood by those skilled in the art. The prompt for value of technology or IP to be received in trade is provided to receive from a user an estimate of the worth, or relative valuation, of the use or ownership of technology or intellectual property that will likely be received by the licensor in return for the license. Such value can be based on a variety of factors, including cost reduction for the licensor resulting from ability to use new technology or actions resulting from newly acquired IP rights, ability to reduce competition against the licensor based on newly acquired IP rights, etc. Continuing in FIG. 4, relationship goodwill is a positive value element that can create professional relationships and mutual understandings that can drive future licensing arrangements and other profitable ventures between companies, thus the user can input an estimated value (e.g., dollar amount, relative number on a scale, or textual descriptions of value) for the predicted relationship goodwill. Value estimations of community service publicity and technology leader publicity include estimated values to the potential licensor in public and customer perceptions regarding the licensor as a good corporate citizen and as a leader in technology. The value to a licensor that a license will encourage a particular technology or asset to become adopted as an actual or de facto industry standard can also be entered. Finally, if a brand name of a licensor is going to be enhanced, the value of that enhancement can also be input. Other implementations include additional inputs, including, among others, identifying how important the deal might be to certain people within the licensor's organization, including identifications of those people, etc.

The negative value elements section 430 includes a prompt for lost revenue from traditional customers. Licensing to a competitor can enable the competitor to better compete with the licensor, which may result in lost revenue from traditional customers for the licensor, and this amount can be estimated and input through this first prompt in the negative value elements section 430. A dilution of brand prompt is provided for receiving an estimate of the potential lost value due to overuse of a trademark. An amount of value risked due to potential bad quality in products or services being produced, used or sold by a licensee is entered through another prompt. Prompts are also provided for receiving the value of potential liability arising from licensee activities and the amount of other types of potential liabilities, such as liability due to defective products, safety issues, etc. Finally, distraction from the core or traditional business of a licensor can effectively cost the licensor money, and a prompt is provided for receiving that negative value. Of course, as mentioned above, other input mechanisms are used in other embodiments of the present disclosure, and alternative embodiments also include no input screens such as input screen 400, relying instead on fully automated processes that make value determinations based upon data retrieved from stored sources, including those located locally and remotely to the prospective indication information processing system 125.

Referring back to FIGS. 1 and 3, step 314 indicates that processing continues with prospective indication information processing system logic 130 as received prospective indication information is processed, such as through conversion logic 152, to convert quantified information into a common measurement system format. For example, if various user input is received in dollars as well as in numbers on a relative scale of 1-10, the conversion logic 152 converts a portion of the input into one scale or the other, and in one implementation, dollars is automatically used as the common measurement system format. In some embodiments, the common measurement format is dynamically selected based upon the format most commonly used by a particular user when providing inputs through input screen 400. In addition, in some embodiments, the conversion step 314 is effectively avoided if all inputs are received in one format. As mentioned above with regard to help icons 422, some embodiments include additional setup screens and supporting logic for prompting users to provide definitional information for functions represented by FIG. 3, as discussed in more detail below. For example, setup screens are preferably provided for assigning dollar amounts to various levels in a 1-10 scale that a user may utilize as an input format. In some of those embodiments, setup screens include user selection interfaces for users to choose or manually define dollar amounts that correspond to specific levels within a range. In some embodiments, setup screens are also provided to system operators to set default conversion definitions in a setup process preceding that of FIG. 3. Thus, in some embodiments, setup logic is included within each of the logic elements of prospective indication information processing system logic 130, while other embodiments include separate setup logic for prompting users for definitional information for configuring functions of prospective indication information processing system logic 130.

In some embodiments, setup screens provide user selection interfaces for a user to configure other aspects of the conversion logic 152, in addition to identifying dollar amounts to assign to range levels. For example, some conversions can be defined as functions of inputs, including user inputs and inputs received from other sources. One specific example, among many others, is that relationship goodwill input in the form of a range value, such as "5", would be multiplied by the input licensing royalty in order to convert the range value to the common measurement system format of dollars. Furthermore, the distraction from core business input could be converted as an input-based fraction of the expected annual gross profit for the licensor, which would be available from one of the static input sources 114, e.g., if 0.01 is defined as such a fraction, an input of 3 on input screen 400 for distraction from core business would be converted to 0.03 times the annual gross profit for the licensor. Other examples, among many others, include converting publicity factors based upon planned advertisement spending by the licensor or potential licensee or upon numbers of people expected to be impacted, all or part of which may be provided in additional user setup screens or obtained through other methods, such as from static input sources 114. Thus, in one embodiment, a user could define a mathematical relationship (such as through a basic prompt or through a spreadsheet-type interface, i.e., an interface having a grid of cells arranged in labeled rows and columns that are able to receive formulas referencing other cells, as examples among others) between available inputs, including multiple inputs and more complex associations for each definable conversion. Of course, other embodiments provide no user setup modifications to the conversion logic 152 and automatically utilize such complex, multi-input-based conversions, while others provide for user modifications to such default conversion formulas.

Step 316, corresponding in one embodiment to processing by quantification logic 156 in FIG. 1, indicates that processing continues with prospective indication information being quantified into the common measurement system format. For example, a textual value input, such as "high", "most unlikely", etc., is quantified into dollars if dollars is the common measurement format. While some embodiments include dollar amounts assigned to specific text inputs provided for each value prompt, other embodiments include calculations based upon other inputs. For example, a "very high" textual input could be quantified into, for example, 8 times the input licensing royalty. In a manner similar to the conversion logic 152, the quantification logic 156 provides, in some embodiments, facilities for users to define aspects of the quantification logic, including assigned dollar amounts, calculation formulas based upon one or multiple other inputs, etc. In addition, for other embodiments, quantification logic 156 likewise processes input from check boxes or other graphical interfaces for receiving unquantified indications, and various embodiments likewise include user-definable functionality similar to that discussed above so that a user is prompted for quantification definition information. Of course, if only quantified indication information is received from a particular user, no quantification is performed in some embodiments.

It should also be understood that, in some embodiments, there is interaction between conversion logic 152 and quantification logic 156. For example, the quantification logic 156 may communicate with, or read memory settings configured by, conversion logic 152 to determine the common measure system format into which unquantified indication information is to be quantified. In addition, process re-ordering between conversion logic 152 and quantification logic 156 may occur for specific inputs. For example, as conversion logic 152 processes input indication information, unquantified indication information is communicated to quantification logic for quantifying the unquantified indication information into relative range values that are then converted by conversion logic 152 into the common measurement system format. Other embodiments include utilizing multiple common measurement system formats in parallel through the following balancing processing, as discussed below, and converting the balanced result information into a final recommendation. Still other embodiments include not converting or quantifying some of the inputs received through input screen 400, as well as not including them in the balancing of step 318, as discussed below.

Refer now to FIG. 5, which is a screen shot view of the example user input screen 400, showing an overlaid definitional setup screen 500 that would be invoked, in one embodiment, upon activation of the help icon 422 associated with the prompt for relationship goodwill. Specific textual help information 505 is shown near the top of screen 500, and shown near the bottom of screen 500 are "save" and "cancel" buttons for saving and canceling the saving of any changes to the definitional settings. A "conversion from:" prompt 510 with a dropdown arrow 512 and an associated "conversion to:" prompt 514 with a dropdown arrow 516 are shown above a "quantification from:" prompt 520 with a drop arrow 522 and an associated "quantification to:" prompt 526 with a dropdown arrow 528. Supporting logic for definitional setup screen 500 is also included in support of the following functions. As the range values from 1 to 10 are selected through dropdown arrow 512 for prompt 510, a user is able to provide inputs into prompt 514. As discussed above, while specific dollar amounts may be input into prompt 514, a formulaic expression may also be input, as shown in FIG. 5. Thus, in the example shown, for a "5" value, in a range of 1-10, the conversion logic 152 will convert the "5" according to the formula, "P3×P1," where "P3" represents the value input into the third positive value element prompt, i.e., the relationship goodwill prompt, which happens to be "5" in this example, and "P1" represents the value input into the first positive value element prompt, the licensing royalty prompt. The user can define each value in the range of 1-10 through prompt 510 to be the same formula, or different formulas, or different monetary values, among others. Furthermore, the negative value element prompts can be represented with an "N," instead of a "P", and links can also be established as queries to other static and dynamic data stores, including table, record, and field designations in local or remote databases. In addition, as discussed above, rather than, or in addition to, the basic prompt 514, other embodiments include spreadsheet-type interfaces for more easily designating more complex formulaic expressions.

The quantification prompts 520 and 526 provide for designating quantification definitional information that defines the quantification for quantification logic 156 for the specific input referred to as relationship goodwill. Thus, in the example shown, a user has indicated that inputting the value of relationship goodwill as "High" will result in a quantification of that textual input, or selection, as $1,000,000, with dollars being the common measurement system format in the particular example embodiment shown. Similarly, a user is able to utilize the dropdown arrows 522 and 528, as well as provide direct textual and numeric input, to define the quantification value for each other potential textual input into the relationship goodwill prompt. Preferably, as definitional relationships are established through setup screen 500, future processing employs similar definitions unless altered. Other embodiments include user-based distinctions in the storage of such definitional information, i.e., conversion and quantification definitional information is saved with respect to individual users so that different users may use different sets of definitional information.

Referring back to FIG. 3, in step 318, corresponding in one embodiment to processing by balancing logic 160 in FIG. 1, the common measurement format indication information is balanced to generate a balanced combination result. For example, as available quantified inputs are converted into a single common measurement format, and available unquantified inputs are quantified into that single format, the inputs are balanced by summing all of the positive value inputs (e.g., those entered in the positive value elements section 425) into a total of the positive value inputs (shown in the positive total area 428 in FIG. 4), summing all of the negative value inputs (e.g., those entered in the negative value elements section 430) into a total of the negative value inputs (shown in the negative total area 438 in FIG. 4), and then subtracting the total of the negative value inputs from the total of the positive value inputs (resulting in a balanced total as shown in the balanced total area 440 in FIG. 4). Other embodiments include applying weighting factors to various common measurement format input values before summing them with other input values. In some of those embodiments, such weighting can similarly be modified by users in setup screens and supporting logic.

Step 320, which corresponds in one embodiment to processing by threshold logic 160 in FIG. 1, includes the balanced combination result being compared to a plurality of ranges of thresholds in order to determine a rating. In various embodiments, possible ratings include, among others, recommendations for or against proceeding with a particular licensing effort, as well as additional ratings, such as a rating that additional information is needed, among others. In one specific example, if the balanced combination result is between $0 and $100,000, a "do not proceed" rating is assigned; if the balanced combination result is between $100,000 and $5,000,000, a "need more information" rating is assigned; and if the balanced combination result is above $5,000,000, a "proceed" recommendation is assigned. Similar to other processing logic discussed above, additional screens and supporting logic are provided in other embodiments to enable a user to adjust threshold ranges and recommendations, as well as delete and create threshold ranges. Other embodiments include a rating process that assigns a numeric rating according to a scale of ratings, e.g., 1-100, and textual recommendation ratings (e.g., "proceed", etc.) are assigned based upon sub-ranges with the scale of ratings, e.g., "proceed" may apply to ratings above 80, etc. In some of those embodiments, sub-ranges within the range of ratings can be split across varying (i.e., proportionately different) ranges of balanced combination results, e.g., numeric ratings 0-10 spread over balanced combination results $0-$200,000, numeric ratings 11-20 spread over balanced combination results between $200,000 and $300,000, etc.

Referring now to step 322, which corresponds in one embodiment to processing by analysis logic 168 in FIG. 1, the rating generated in step 320 is analyzed along with additional information not considered as part of the balancing processing in step 318 and the rating generation process in step 320. For example, the geographic location of the headquarters of the potential licensee can be compared to the geographical location of the licensor, and if the locations are less than a defined distance between each other, additional conclusions can be drawn, such as generating a distance-varying warning against the potential licensing arrangement, or even modifying the generated rating to upgrade or downgrade it to a different rating. In various embodiments, the additional information is received as input from static input source 114 and from dynamic input source 110. In alternative embodiments, the additional information is used in both the rating process, as well as part of the analysis processing by analysis logic 168.

Step 324, which corresponds in one embodiment to processing by recipient ID logic 172 in FIG. 1, includes identification of a particular recipient (a particular output receiver 118) among a plurality of potential recipients for a report (one example of a result communication) that includes the generated rating from step 320 and results of the analysis in step 322. In one embodiment, the recipient ID logic 172 maintains a recipients database that includes contact information, such as an e-mail address, etc., along with selection criteria fields for each potential recipient. For example, one recipient may receive all reports for prospective licenses that receive a "do not proceed" rating, whereas other recipients are identified based upon technology-specific criteria to receive reports for the prospective licenses receiving "need more information" ratings, etc. Thus, in one embodiment, the recipient ID logic 172 is configured to compare the generated rating and results of the analysis to the selection criteria fields in the potential recipients database in order to identify an appropriate recipient. Other embodiments include communicating with multiple recipients, and still other embodiments also include displaying the report to the user providing the input through input screen 400.

In step 326, which corresponds in one embodiment to processing by reporting logic 176 in FIG. 1, a report is prepared for the recipient identified in step 324. As indicated above, in one embodiment, the report includes the generated rating from step 320 and results of the analysis in step 322. Refer also to FIGS. 6 and 7, which both show screens corresponding to a sample prospective opportunity. FIG. 6 is a screen shot view of one example of the user input screen 400 showing sample inputs for one prospective opportunity, in accordance with one embodiment of the present disclosure. FIG. 7 shows a corresponding screen shot view of one example of a result communication 700, in the form of a report, in accordance with one embodiment of the present disclosure. Result communication 700 is shown in the form of an e-mail message, but it should be understood that other communication formats are also included within the scope of the present disclosure, including instant messaging, facsimile, text messaging, etc. An example communication header section 710 is shown including a sender name of "Competitive Advantage Assessment System", an intended recipient of "John Smith", and a subject line that includes a prospective opportunity ID of 32872, as examples. A descriptive information section 720 is shown including basic information about the prospective opportunity, including a patent number and information regarding a potential licensee, including name of the potential licensee, location of headquarters, number of employees, and gross revenue. As discussed above, in accordance with one embodiment, identification of the name of the potential licensee by the user (dynamic input source 110) providing input through input screen 400 enables the reception logic 140 to obtain the additional information (location, number of employees, gross revenue) from the static input source 114.

Positive value elements section 730 is shown including one example, among others, of a narrative translation of the converted and quantified results of inputs in positive value elements section 425 of input screen 400 in FIG. 6. Similarly, negative value elements section 740 is shown including one example of a narrative translation of the results of inputs in negative value elements section 430 of input screen 400. It should be noted that this translation process can also include conversions from non-text inputs into narrative indications, e.g., a "5" or a specific dollar amount is translated into the indicated "moderate" opportunity for community service and technology leader publicity. Additional embodiments include providing user control into defining parameters and other aspects of this conversion process, similar to the user configuration functions discussed above for other functions. A rating section 750 is also shown that communicates a narrative version of the results of the balancing of step 318 and rating of step 320. Finally, an additional analysis section 760 is shown that communicates a narrative version of results of additional analysis referenced in step 322 that is based, at least in part, on information not balanced in step 318, as discussed above. Of course, other embodiments include communications with fewer than all of the elements shown in FIG. 7, while other embodiments include communications having additional information, such as one or more of the following types of information, among others: each of the stages of conversions and quantifications referenced in steps 314 and 316, details regarding the conversion and quantification computations, the numeric results of the summing and balancing referenced in step 318, specific threshold ranges considered in the rating process referenced in step 320, etc. Step 328, which corresponds in one embodiment to processing by transmission logic 180 in FIG. 1, indicates that the report is transmitted to the identified recipient, corresponding to the output receiver 118 in FIG. 1. At that point, in one embodiment, lead personnel in a prospective licensing arrangement, among others, are able to make more intelligent decisions and more appropriate planning regarding whether and/or how to proceed with pursuing the prospective licensing arrangement.

FIG. 8 is a screen shot view of one example of a screen for managing multiple prospective opportunity scenarios, in accordance with one embodiment of the present disclosure. After data regarding a plurality of prospective opportunities is balanced, processed, and stored, as discussed above, additional collecting and further processing for providing management functionality is provided to users. In one embodiment, analysis logic 168 provides the additional functionality, while other embodiments include separate logic for such processing. In one embodiment, a user is provided a tool for managing separate discrete portions, or segments, of a licensing program through a portfolio manager that enables the user to analyze multiple scenarios for each portfolio segment. FIG. 8 shows a portfolio manager screen 800 that includes a portfolio segment scenario identification (ID) prompt 820 with a dropdown arrow 821 showing an example portfolio segment scenario ID of "2853." User interaction with the portfolio segment scenario ID prompt 820 and dropdown arrow 821 are similar to the user interaction discussed above with regard to the prospective opportunity ID in FIG. 4. Accordingly, the portfolio segment scenario ID prompt 820 will default to a new number, or other alphanumeric designation, for a new portfolio segment scenario analysis. In addition, a user is able to select a previously stored scenario analysis by providing an existing portfolio segment scenario ID through direct input or selection through the associated dropdown arrow. Selection of an existing portfolio segment scenario ID will result in remaining prompts on FIG. 8 being populated from stored information associated with that portfolio segment scenario ID.

As shown in FIG. 8, a scenario grid 822 includes columns and rows of prospective opportunity ID prompts 823 with associated dropdown arrows, positive total areas 824 with associated checkboxes, negative total areas 828 with associated checkboxes, balanced total areas 830 with associated checkboxes, and likelihood weight prompts 838 with associated definition icons 840 and checkboxes 842. As a user inputs (through direct typing, or selecting with the associated dropdown arrow) a previously stored prospective opportunity ID in a prospective opportunity prompt 823 on a particular row in the scenario grid 822, the positive total area 824, negative total area 828, and balanced total area 830 on that particular row are automatically populated with the stored data previously shown in the positive total area 428, negative total area 438, and balanced total area 440, respectively, shown in FIG. 4. Thus, the scenario grid 822 provides a simultaneous display of positive value element totals, negative value element totals, combined balanced totals, and likelihood weightings for a plurality of prospective opportunities for which previous processing and storage have already occurred. The checkboxes associated with each of the areas shown in the scenario grid 822 preferably default to being checked, but a user may selectively uncheck the boxes to effectively remove the associated data from being included in further processing. Of course, while the example data is shown with an "M" (for millions of dollars) in the number for convenience of illustration, exact dollar amounts, as well as other analysis formats instead of dollars, are included in other implementations.

The likelihood weight prompts 838 preferably default to "1.0," which would be reflective of a user's prediction of a 100% likelihood that a particular opportunity is going to realized. Conversely, a likelihood weight of "0.01" would reflect only a 1% likelihood, i.e., such a prospective opportunity would be considered, in one sense, a risky deal from the standpoint that the user would consider there to be a large risk that the prospective opportunity is not likely to occur. In another sense, prospective opportunities that have a relatively large negative value element total could also be considered "risky" deals since, if they occur, they pose a relatively higher risk to the licensor. Consequently, the scenario analysis tool shown as FIG. 8 will enable a user to easily visualize both types of "risks" in order to manage them accordingly.

In one implementation, a user is able to simply type in a number into an associated likelihood weight prompt 838 for a particular prospective opportunity in order to assign a likelihood weight to that particular prospective opportunity for the particular scenario analysis identified in the portfolio segment scenario ID prompt 820. In addition, in one embodiment, a define (help) icon 840 can be used to assist a user in calculating a likelihood weight by invoking a likelihood definitional screen 844. In implementation, the likelihood definitional screen adds together factors such as strength of a particular asset (e.g., a measure of the perceived relative strength and breadth of a particular patent in the context of a particular prospective license), likelihood of licensee compliance (e.g., a perception of how amenable this particular potential licensee is to these types of licenses, or this license in particular), likelihood of timing horizon completion (e.g., whether the deal is likely to be done within a goal timeframe, such as a fiscal year under consideration), etc. Of course, some embodiments do not include such a definitional setup screen, while others utilize different calculations for determining likelihood weights, e.g., positive and negative factors that are summed together. Still other embodiments include automated logic for determining likelihoods, such as interfacing with other processes and stored data.

Likelihood-weighted totals are shown located under the scenario grid 822, including in a likelihood-weighted positive total area 848, a likelihood-weighted negative total area 850, and a likelihood-weighted balanced total area 852. An average likelihood weight is shown in an average likelihood weight area 854. The amount calculated to be shown in the likelihood-weighted positive total area 848 includes a sum of weighted multiplication products of all amounts shown in checked positive total areas 824. Thus, for example, $61.25M=($15M×0.55)+($100M×0.25)+($35M×0.8). Similar multiplications and summing calculations are made for the likelihood-weighted negative total area 850 and the likelihood-weighted balanced total area 852. If any of the amounts shown in the scenario grid 822 had not been checked, they would not have been included in the calculations. Other embodiments include showing each of the individual weighted amounts, e.g., showing $8.25M, which is the result of $15M×0.55. Some embodiments include showing that amount in place of the $15M shown in the positive total area 824, which would change automatically as likelihood weights are changed, while other embodiments include displaying the individual weighted amounts in addition to the non-weighted amounts shown in the scenario grid 822. Still other embodiment include assigning likelihood weights separately to the positive totals, negative totals, and balanced totals, as well as providing averages for each of these sub-risks. In such a way, in such embodiments, risks as to potential negative impacts can be more easily analyzed separately from risks of whether deals are likely to occur. Consequently, diverse portfolio segment scenarios can be more easily devised that represent varying levels of the different types of risks and rewards. Moreover, some embodiments recommend utilization of particular personnel for working portfolio segments based on varying levels of risk, as well as based on other conclusions reached in view of the functions disclosed herein. Thus, interfaces are provided for associating particular personnel with specific ranges of data, such as likelihood weights, etc., and such associations are stored for use by logic in making such recommendations.

Also shown are a likelihood-weighted balanced target prompt 872 and a likelihood-weighted target comparison area 877. The likelihood-weighted balanced target prompt 872 is provided for a user to input a balanced revenue target for a particular portfolio segment scenario. The likelihood-weighted target comparison area 877 shows the difference between the amount entered in the likelihood-weighted balanced target prompt 872 and the likelihood-weighted balanced total area 852. In this manner, a user is able to more effectively manage a portfolio segment against a balanced revenue target.

Aspects of embodiments of the present disclosure, such as the prospective indication information processing system logic 130, among others, can be implemented in hardware, software, firmware, or a combination thereof, among other options. In one embodiment, for example, the prospective indication information processing system logic 130 is implemented in software or firmware that is stored in one or more memories and that is executed by one or more suitable instruction execution systems, such as a special or general purpose digital computer, such as a personal computer (PC; IBM-compatible, Apple-compatible, or otherwise), workstation, minicomputer, or mainframe computer, among others. When the prospective indication information processing system logic 130 is implemented in software, as is shown in FIG. 2, it should be noted that the prospective indication information processing system logic 130 can be stored on any computer readable medium for use by or in connection with any computer related system or method. In the context of this document, a computer readable medium includes an electronic, magnetic, optical, or other device or means that can contain or store a computer program for use by or in connection with a computer related system or method. Furthermore, any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments and examples are merely possible examples of implementations, among others, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

We claim:
1. A system for processing prospective indication information, the system comprising:
a processor; and
a memory storing instructions that, when executed by the processor, cause the processor to perform operations comprising
generating a user interface for receiving the prospective indication information, the user interface comprising a plurality of prompts,
providing the user interface to a user, receiving, via the user interface, the prospective indication information, wherein the prospective indication information is input by the user via at least a portion of the plurality of prompts and wherein the prospective indication information comprises value inputs, a first portion of the value inputs designated as a positive value element and a second portion of the value inputs designated as a negative value element, determining a first format used by the user to input at least a portion of the prospective indication information via the at least a portion of the plurality of prompts, wherein more of the prospective indication information is received from the user in the first format than in a second format, selecting the first format as a common measurement system format based on the user using the first format more to input the prospective indication information than the second format, wherein the common measurement system format comprises a numeric monetary format, determining that a value input of the value inputs input by the user comprises a text value associated with a non-numeric text format, responsive to determining that the value input comprises the text value associated with the non-numeric text format, converting the text value of the value input to a monetary value associated with the numeric monetary format of the common measurement system, summing the first portion of the value inputs designated as the positive value element to compute a positive value elements total, summing the second portion of the value inputs designated as the negative value element to compute a negative value elements total, generating result information comprising a balanced total, the balanced total comprising the difference between the positive value elements total and the negative value elements total, identifying a recipient for the result information from among a plurality of potential recipients based upon the result information, wherein identifying the recipient comprises utilizing the result information to distinguish the recipient from among the plurality of potential recipients, and creating, for the recipient, a result communication including the result information.

2. The system of claim 1, wherein a portion of the prospective indication information is omitted in the balanced total, and wherein generating the result information further comprises analyzing both the balanced total and the portion of the prospective indication information that is omitted in the balanced total to produce analysis result information.

3. The system of claim 1, wherein generating the result information further comprises:
   comparing the balanced total to a plurality of threshold ranges;
   matching the balanced total to a threshold range of the plurality of threshold ranges, the threshold range associated with a rating; and
   assigning the rating associated with the threshold range to the balanced total.

4. The system of claim 1, wherein the prospective indication information comprises information related to a transfer arrangement for intellectual property.

5. The system of claim 1, wherein the operations further comprise:

determining that a further value input of the value inputs comprises a numeric value from a range of numeric values; and responsive to determining that the further value input comprises the numeric value from the range of numeric values, converting the further value input to a further monetary value associated with the numeric monetary format of the common measurement system based on a formula, the formula specifying an operand comprising the further value input and another value input of the value inputs.

6. The system of claim 1, wherein a prompt of the plurality of prompts of the user interface receives a prospective opportunity identification associated with the prospective indication information and wherein the prompt defaults to a new prospective opportunity identification.

7. The system of claim 1, wherein a prompt of the plurality of prompts of the user interface receives information regarding an asset associated with the prospective indication information, wherein the prompt comprises a link to an intellectual property asset management system that comprises records corresponding to identified assets.

8. The system of claim 1, wherein creating a result communication including the result information comprises converting non-text inputs of the result information into a narrative indication.

9. A method for processing prospective indication information, the method comprising:
   generating, by a computer system comprising a processor, a user interface for receiving the prospective indication information, the user interface comprising a plurality of prompts;
   providing, by the computer system, the user interface to a user;
   receiving, at the computer system via the user interface, the prospective indication information, wherein the prospective indication information is input by the user via at least a portion of the plurality of prompts and wherein the prospective indication information comprises value inputs, a first portion of the value inputs designated as a positive value element and a second portion of the value inputs designated as a negative value element;
   determining, by the computer system, a first format used by the user to input at least a portion of the prospective indication information via the at least a portion of the plurality of prompts, wherein more of the prospective indication information is received from the user in the first format than in a second format;
   selecting the first format as a common measurement system format based on the user using the first format more to input the prospective indication information than the second format, wherein the common measurement system format comprises a numeric monetary format;
   determining, by the computer system, that a value input of the value inputs input by the user comprises a text value associated with a non-numeric text format;
   responsive to determining that the value input comprises the text value associated with the non-numeric text format, converting, by the computer system, the text value of the value input to a monetary value associated with the numeric monetary format of the common measurement system;
   summing, by the computer system, the first portion of the value inputs designated as the positive value element to compute a positive value elements total;

summing, by the computer system, the second portion of the value inputs designated as the negative value element to compute a negative value elements total;

generating, by the computer system, result information comprising a balanced total, the balanced total comprising the difference between the positive value elements total and the negative value elements total;

identifying, by the computer system, a recipient for the result information from among a plurality of potential recipients based upon the result information, wherein identifying the recipient comprises utilizing the result information to distinguish the recipient from among the plurality of potential recipients; and creating, by the computer system for the recipient, a result communication including the result information.

10. The method of claim 9, further comprising applying disparate weights to various portions of the prospective indication information while generating the balanced total.

11. The method of claim 9, wherein a portion of the prospective indication information is omitted in the balanced total, and wherein generating the result information further comprises analyzing both the balanced total and the portion of the prospective indication information that is omitted in the balanced total to produce analysis result information.

12. The method of claim 9, wherein generating the result information further comprises:

comparing the balanced total to a plurality of threshold ranges;

matching the balanced total to a threshold range of the plurality of threshold ranges, the threshold range associated with a rating; and assigning the rating associated with the threshold range to the balanced total.

13. The method of claim 9, wherein the prospective indication information comprises information related to a transfer arrangement for intellectual property.

14. The method of claim 9, further comprising:

determining that a further value input of the value inputs comprises a numeric value from a range of numeric values; and responsive to determining that the further value input comprises the numeric value from the range of numeric values, converting the further value input to a further monetary value associated with the numeric monetary format of the common measurement system based on a formula, the formula specifying an operand comprising the further value input and another value input of the value inputs.

15. A non-transitory computer-readable medium storing computer-executable instructions that, when executed by a processor, cause the processor to perform operations comprising:

generating a user interface for receiving prospective indication information, the user interface comprising a plurality of prompts;

providing the user interface to a user;

receiving, via the user interface, the prospective indication information, wherein the prospective indication information is input by the user via at least a portion of the plurality of prompts and wherein the prospective indication information comprises value inputs, a first portion of the value inputs designated as a positive value element and a second portion of the value inputs designated as a negative value element;

determining a first format used by the user to input at least a portion of the prospective indication information via the at least a portion of the plurality of prompts, wherein more of the prospective indication information is received from the user in the first format than in a second format;

selecting the first format as a common measurement system format based on the user using the first format more to input the prospective indication information than the second format, wherein the common measurement system format comprises a numeric monetary format;

determining that a value input of the value inputs input by the user comprises a text value associated with a non-numeric text format;

responsive to determining that the value input comprises the text value associated with the non-numeric text format, converting the text value of the value input to a monetary value associated with the numeric monetary format of the common measurement system;

summing the first portion of the value inputs designated as the positive value element to compute a positive value elements total;

summing the second portion of the value inputs designated as the negative value element to compute a negative value elements total; and generating result information comprising a balanced total, the balanced total comprising the difference between the positive value elements total and the negative value elements total.

16. The non-transitory computer-readable medium of claim 15, wherein generating the result information further comprises applying disparate weights to various portions of the prospective indication information while generating the balanced total.

17. The non-transitory computer-readable medium of claim 15, wherein a portion of the prospective indication information is omitted in the balanced total, and wherein generating the result information further comprises analyzing both the balanced total and the portion of the prospective indication information that is omitted in the balanced total to produce analysis result information.

18. The non-transitory computer-readable medium of claim 15, wherein generating the result information further comprises:

comparing the balanced total to a plurality of threshold ranges;

matching the balanced total to a threshold range of the plurality of threshold ranges, the threshold range associated with a rating; and assigning the rating associated with the threshold range to the balanced total.

19. The non-transitory computer-readable medium of claim 15, wherein the prospective indication information comprises information related to a transfer arrangement for intellectual property.

20. The non-transitory computer-readable medium of claim 15, wherein the operations further comprise:

determining that a further value input of the value inputs comprises a numeric value from a range of numeric values; and responsive to determining that the further value input comprises the numeric value from the range of numeric values, converting the further value input to a further monetary value associated with the numeric monetary format of the common measurement system based on a formula, the formula specifying an operand comprising the further value input and another value input of the value inputs.

* * * * *